United States Patent [19]

Stanley

[11] 4,383,203
[45] May 10, 1983

[54] CIRCUIT MEANS FOR EFFICIENTLY DRIVING AN ELECTRODELESS DISCHARGE LAMP

[75] Inventor: Charles A. Stanley, San Jose, Calif.

[73] Assignee: Litek International Inc., Hayward, Calif.

[21] Appl. No.: 278,888

[22] Filed: Jun. 29, 1981

[51] Int. Cl.³ .................... H05B 41/24; H03H 7/01
[52] U.S. Cl. .................... 315/248; 333/175; 333/177; 315/267; 315/276; 315/278; 330/207 A
[58] Field of Search ............ 315/248, 267, 276, 278, 315/39; 330/188, 195, 207 A; 333/172, 175, 32

[56] References Cited

U.S. PATENT DOCUMENTS 4,010,400 3/1977 Hollister .................... 315/248
4,048,541 9/1977 Adams et al. ................ 315/248

*Primary Examiner*—Eugene La Roche
*Assistant Examiner*—Vincent DeLuca
*Attorney, Agent, or Firm*—Philip M. Hinderstein

[57] ABSTRACT

In an electrodeless discharge lamp of the type including an ionizable medium within a sealed envelope capable of emitting radiant energy when subjected to a radio frequency field, an oscillator for generating an output signal at a given radio frequency of 13.56 MHz, an RF amplifier responsive to the oscillator output signal, and an induction coil and a capacitor connected in series and responsive to the output of the amplifier, the coil being positioned in close physical proximity to the medium in the envelope for coupling to the medium an electric field having a magnitude sufficient to initiate ionization of the medium and a magnetic field for maintaining ionization, there is disclosed an improvement wherein a Class D amplifier drives the series connected coil and capacitor without a separate load circuit connected in the output circuit of the amplifier. A specially selected filter and matching network coupled between the Class D amplifier and the series connected coil and capacitor reduces $CV^2f$ losses, filters the output of the Class D amplifier to minimize harmonics, and matches the output impedance of the amplifier to the input impedance of the discharge to set the desired light level. The filter and matching network include specially designed induction coils for reducing radio frequency interference. Elements of the filter and matching network are variable to adjust the light level output of the lamp.

21 Claims, 8 Drawing Figures

CIRCUIT MEANS FOR EFFICIENTLY DRIVING AN ELECTRODELESS DISCHARGE LAMP

BACKGROUND OF THE INVENTION

1. Field of the Invention

The present invention relates to electrodeless discharge lamps and, more particularly, to circuit means for efficiently driving an electrodeless discharge lamp.

2. Description of the Prior Art

In U.S. Pat. No. 4,010,400, there is disclosed an electrodeless discharge lamp of the type including an ionizable medium within a sealed envelope including at least one particular ionizable gas at a given pressure capable of emitting radiant energy when subjected to a radio frequency field. An electric field having a magnitude sufficient to initiate ionization of the medium to form a radiation emitting discharge is coupled to the medium. Simultaneously, a radio frequency magnetic field for maintaining ionization is coupled to the medium. If the various parameters of the lamp are properly selected, a high efficiency electrodeless fluorescent lamp is theoretically possible.

It is known to drive the medium by means of an oscillator, which is usually crystal controlled, for generating an output signal at a given radio frequency, an RF amplifier responsive to the oscillator output signal, and an induction coil and a capacitor connected in series and responsive to the output of the amplifier. The coil is positioned in close physical proximity to the medium in the envelope for coupling to the medium the electric field and the magnetic field.

Such a lamp generally operates at 13.56 MHz, because the Federal Communications Commission permits such frequency to be used with great liberality. However, when operating at such frequency, a large number of problems are created. Thus, in spite of the promise of such an electrodeless discharge lamp, such promise has not been fulfilled heretofor because of difficulties in solving such problems.

The first problem is in selecting an amplifier circuit which will operate efficiently. That is, efficiently converting input energy into output power is essential if an electrodeless fluorescent lamp is to compete effectively with other types of lamps. A Class A amplifier has very low efficiency, generally less than 30%, rendering it unsuitable. A Class B amplifier has the potential of being 78.5% efficient, but, in reality, it generallly runs significantly less than this, rendering it unsuitable. A Class C amplifier is also very dependent on device-related parameters. In other words, a Class C circuit is quite sensitive to various capacitances within the circuit so that a Class C circuit does not lend itself well to mass production. Furthermore, transistors with ratings which are often three times whatever the DC input supply is are generally required and this presents significant problems.

A Class E amplifier has the potential of being 100% efficient because it functions as an on/off switch. Furthermore, it is not dependent on device-related parameters. On the other hand, it has an even worse voltage potential than a Class C amplifier in that a transistor rating of as much as four times the DC input supply is required, rendering the circuit impractical.

A Class D amplifier has the potential of being 100% efficient because it also functions as an on/off switch and the transistors require a rating of only 125% of whatever the DC input supply is. Furthermore, a Class D amplifier is typically not dependent on device-related parameters.

On the other hand, several factors suggest against the use of a Class D amplifier. First of all, Class D amplifiers have always required a load resistor and this results in a power loss. That is, it is generally considered that if a Class D amplifier drives a series resonant circuit, there is generally a short circuit at resonance, which would burn up the transistors. Thus, additional load circuits have always been added to prevent this from occurring.

Furthermore, if MOS devices are used for fast switching, there is always some inherent capacitance across the drain/source of the transistors and, considering that the output of each transistor is a square wave, this output capacitance has to be continuously charged and discharged. The generally accepted expression for calculating the losses inherent in charging and discharging this capacitance is $\frac{1}{2}CV^2f$. However, for the purposes of this application, these losses will simply be referred to as $CV^2f$ losses. Initially, available MOS devices had an output capacitance on the order of 400 pf. With a dc supply voltage of 140 volts and a frequency of 13.56 MHz, the $CV^2f$ loss amounted to 53 watts dissipated power in charging and discharging the output capacitance. This is greater than the power one wants to consume for an entire light bulb. Even with more modern MOS transistors having an output capacitance of as low as 35 pf, one is theoretically still faced with an unacceptable 4.6 watts of loss. Therefore, it has been assumed that to use a Class D amplifier, a circuit would only work efficiently up to about 50 volts. Such a low voltage presents problems in initiating the discharge.

Still further, whenever a signal is generated at 13.56 MHz, there is the possibility of the generation of certain undesirable harmonics. If a switching type amplifier, such as a Class D or E amplifier, is used to drive an electrodeless discharge lamp, the output of the amplifier will be a square wave which is rich in harmonics. There is a harmonic at 54.24 MHz, a frequency close to that of television channel 2, a harmonic at 67.8 MHz, a frequency close to that of television channel 4, and harmonics at other odd multiples of the fundamental. Thus, there exists the possibility that the driving of an electrodeless discharge lamp at 13.56 MHz will create radio frequency interference (RFI) which will interfere with channels 2 and 4 of the TV band, as well as other allocated frequencies. This requires the addition of a filter network between the output of the amplifier and the series connected coil and capacitor.

Still further, if a discharge lamp of the above type is built without regard for the RFI problem, it will generally be found that the light level output is higher than desired. Thus, between the output of the amplifier and the drive induction coil, an impedance matching network that will set the level of the light output is necessary, such network matching the output impedance of the amplifier to the input impedance of the discharge. This requires an additional circuit. A satisfactory solution to all of the above problems has been unavailable heretofor.

SUMMARY OF THE INVENTION

According to the present invention, these problems are solved by the provision of circuit means for efficiently driving an electrodeless discharge lamp. According to the present invention, a Class D amplifier circuit is used without a separate load circuit and in a manner which substantially reduces $CV^2f$ losses. A single circuit functions as a filter to reduce RFI and as a matching network to provide an operating voltage to set the light output level. The same network can be used to vary the light output level of the bulb as well as to provide a trap at the frequencies of TV channels 2 and 4.

Briefly, in an electrodeless discharge lamp of the type including an ionizable medium within a sealed envelope capable of emitting radiant energy when subjected to a radio frequency field, an oscillator for generating an output signal at a given radio frequency, an RF amplifier responsive to the oscillator output signal, and an induction coil and a capacitor connected in series and responsive to the output of the amplifier, the coil being positioned in close physical proximity to the medium in the envelope for coupling to the medium an electric field having a magnitude sufficient to initiate ionization of the medium and a magnetic field for maintaining ionization, there is disclosed the improvement wherein the amplifier is a Class D amplifier including first and second transistors connected in series and driven alternately on and off by the oscillator output signal, the junction betweeen the transistors being connected to the series connected coil and capacitor without a separate, discrete load circuit connected in the output circuit of the amplifier. According to a preferred embodiment of the invention, a filter network is positioned between the transistor junction and the series connected coil and capacitor for presenting a low impedance to the given radio frequency and a higher impedance to all other frequencies. Preferably, the filter network is also an impedance matching network for matching the impedance of the output of the RF amplifier to the reflected resistance of the discharge in the envelope. Such a configuration further functions to substantially reduce $CV^2f$ losses.

Means are also provided for constructing the inductors in the filter and matching network to provide parallel resonant traps to reduce RFI at the frequencies of TV channels 2 and 4. Furthermore, at least one of the elements of the filter and matching network is variable to provide a dimmable bulb.

OBJECTS, FEATURES AND ADVANTAGES

It is therefor the object of the present invention to solve the problems encountered heretofor in providing circuit means for efficiently driving an electrodeless discharge lamp. It is a feature of the present invention to solve these problems by providing a Class D amplifier circuit, preferably with a combined filter and matching network which provides multiple functions. An advantage to be derived is an efficient drive circuit. A further advantage is the reduction of $CV^2f$ losses. A still further advantage is the reduction in RFI. Another advantage is the ability to set the output light level. Still another advantage is a single circuit for reducing RFI, setting the light level output, and reducing $CV^2f$ losses. Still another advantage is the ability to provide traps at the frequencies of TV channels 2 and 4. Still another advantage is the ability to make a bulb dimmable.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

DESCRIPTION OF THE PREFERRED EMBODIMENTS

Figure 1:
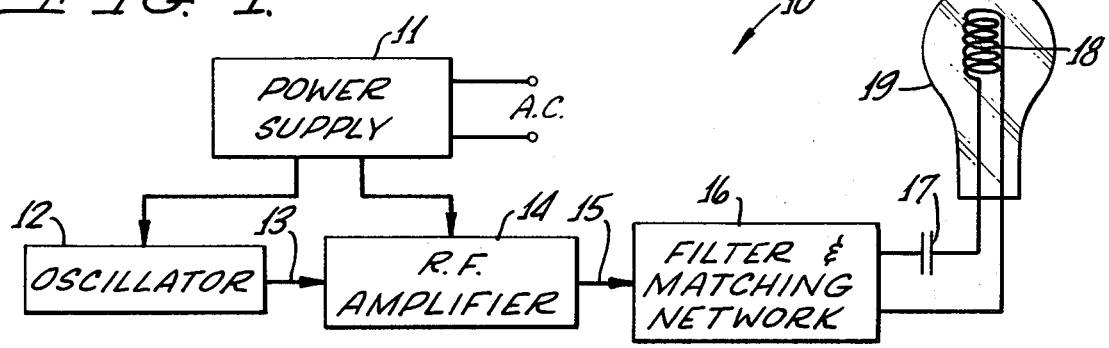
FIG. 1 is a block diagram of an electrodeless discharge lamp.

Referring now to the drawings and, more particularly, to FIG. 1, an electrodeless discharge lamp, generally designated 10, of the type described in U.S. Pat. No. 4,010,400, includes several basic components. The first component is a power supply 11 which receives ac power at its input and produces one or more dc voltages at its output for powering the remaining components. Such components typically include an oscillator 12, which is usually crystal controlled, for generating an output signal at 13.56 MHz. This signal is applied over a line 13 to an RF amplifier 14 which produces the power necessary to drive the discharge. As will be described more fully in connection with the present invention, the output of RF amplifier 14 on line 15 is optionally, but preferably, applied via a filter and matching network 16 to a series capacitor 17 and induction coil 18, the latter extending into a cavity within a sealed envelope 19. Positioned within envelope 19 is an ionizable medium including at least one particular ionizable gas at a given pressure capable of emitting radiant energy when subjected to a radio frequency field.

As described more fully in the beforementioned U.S. Pat. No. 4,010,400, the series capacitor 17 and inductor 18 function to multiply the voltage at the output of RF amplifier 14 to create across coil 18 an electric field having a magnitude sufficient to initiate ionization of the medium in envelope 19. Coil 18 also couples to the medium a radio frequency magnetic field for maintaining the ionization. If the various parameters of the lamp are properly selected, a high efficiency electrodeless fluorescent lamp is theoretically providable.

Figure 2:
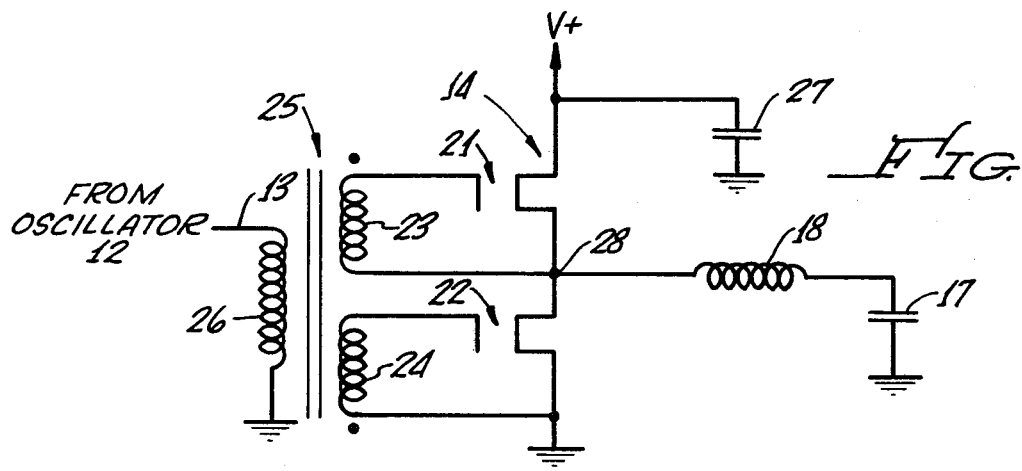
FIG. 2 is a circuit diagram of a first embodiment of RF amplifier for use in the lamp of FIG. 1.

Referring now to FIG. 2, there is shown a preferred embodiment of RF amplifier 14 including a pair of series connected MOS transistors 21 and 22, the source of transistor 21 being connected to a dc voltage V+ in power supply 11 and the drain of transistor 22 being connected to circuit ground. The drain of transistor 21 is connected to the source of transistor 22. In order to drive transistors 21 and 22 alternately on and off, the gates thereof are connected to two separate secondary windings 23 and 24 of a transformer 25. Windings 23 and 24 are out of phase. The primary 26 of transformer 25 receives the 13.56 MHz signal on line 13 from oscillator 12. A capacitor 27 connected between the source of transistor 21 and circuit ground functions as an ac return to make the supply voltage a low impedance point at 13.56 MHz. Thus, the arrangement of RF amplifier 14 shown is completely symmetrical about the junction 28 between transistors 21 and 22.

MOS devices are chosen for transistors 21 and 22 because at the frequency of operation of lamp 10, they are much more efficient. Bipolar devices have a relatively fast turn on time, but are very slow in turning off due to storage time in their bases. With MOS devices, transistors 21 and 22 turn on faster and turn off just as fast.

According to a first teaching of the present invention, capacitor 17 and plasma drive coil 18 may be connected in series between junction 28 and circuit ground. That is, it is the teaching of the present invention that the series resonant circuit consisting of capacitor 17 and coil 18 is all that is required as the load for Class D amplifier 14, without the addition of a separate, discrete load circuit which has always been considered necessary in Class D amplifier circuits.

More specifically, the voltage at the output of a Class D amplifier, at junction 28, is a square wave which alternates between V+ and circuit ground. Capacitor 17 and inductor 18 function as a series resonant circuit for converting the square wave to a sine wave to drive the load represented by the medium in envelope 19. In such case, capacitor 17 and inductor 18 present a low impedance to the fundamental and a high impedance to all other frequencies. It would be thought that at resonance, there would be a short circuit between junction 28 and circuit ground, causing transistors 21 and 22 to burn up. However, this is not the case.

The reason is that inductor 18 is being used to drive the discharge within envelope 19 and this discharge inherently feeds back into the series circuit a resistive load. In one embodiment of the present invention, in which coil 18 is made from 18 turns of number 16 gauge copper wire, the discharge reflects back a resistance of 50 ohms at a given power level. This resistance provides a load for Class D amplifier 14, preventing short circuiting of transistors 21 and 22. The effect is that capacitor 17 and inductor 18, when connected in series to drive an electrodeless discharge lamp, function together, with the discharge, in the same manner as a three component circuit, the third component being a separate, discrete load circuit, except the load circuit is not required.

Figure 3:
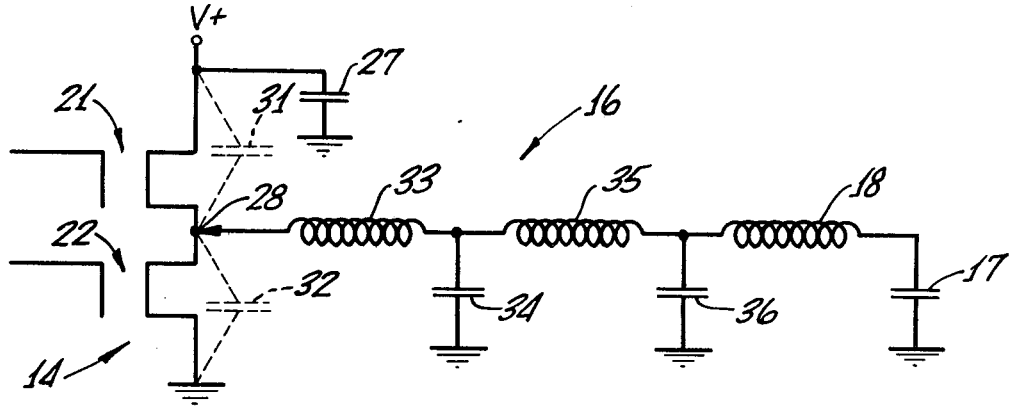
FIG. 3 is a circuit diagram of a first embodiment of RF amplifier and filter and matching network for use in the lamp of FIG. 1.

The simplified circuit of FIG. 2 does not provide a solution for various other problems encountered when using a Class D amplifier to drive an electrodeless discharge lamp. Referring now to FIG. 3, one of these additional problems is the fact that there is some capacitance inherent across the drain/source of any MOS device. This inherent capacitance is shown in phantom in FIG. 3 as capacitors 31 and 32. Since transistors 21 and 22 are alternately turned on and off, capacitors 31 and 32 must be continuously charged and discharged. The expression used for calculating the power loss associated with such charging and discharging is $\frac{1}{2}CV^2f$. It is therefore seen that the higher the frequency and the higher the voltage, the greater the loss. Accordingly, it has been assumed, heretofor, that with $V+ = 140$ volts and $f = 13.56$ MHz, the losses associated with capacitors 31 and 32 would be so high as to make a Class D amplifier impractical for use in this circuit.

According to the teachings of the present invention, a filter and matching network 16 is connected between junction 28 and the series circuit consisting of capacitor 17 and inductor 18. Filter and matching network 16 preferably includes a pair of tuned circuits, the first tuned circuit consisting of an inductor 33 and a capacitor 34 connected in series between junction 28 and circuit ground and the second tuned circuit consisting of an inductor 35 and a capacitor 36 connected in series between the junction between inductor 33 and capacitor 34 and circuit ground. The series circuit consisting of capacitor 17 and inductor 18 are then connected between circuit ground and the junction between inductor 35 and capacitor 36.

The use of such a filter and matching network provides several remarkable results. First of all, it was expected that this combination would have an output efficiency no greater than 50% because of the $CV^2f$ losses. However, tests have shown that the output efficiency is more on the order of 85%. The reason for this is that the particular filter and matching network 16 selected inherently reduces the $CV^2f$ loss problem. That is, it is seen that each output capacitance 31 and 32, being connected between junction 28 and circuit ground, forms a CLC resonant network with inductor 33 and capacitor 34 in filter and matching network 16. A CLC resonant network is, by definition, a lossless network, assuming ideal capacitors and inductors. Therefore, at least theoretically, it has been discovered that using an LC type of filter and matching network inherently solves the $CV^2f$ loss problem.

In practice, there is still some loss due to the transistor output capacitors 31 and 32 because their values are non-linear with voltage. When the voltage is very low, the capacitance is high and when the voltage is high, the capacitance is low. One can select the values of inductors 33 and 35 and capacitors 34 and 36 for the most optimum $CV^2f$ cancellation and, in practice, it has been found that approximately 70% of the capacitance of capacitors 31 and 32 can be combined into filter circuit 16, so that the power loss is only 30% of what one expects. However, eliminating 70% of the power loss renders the circuit sufficiently efficient to make it practical for use in lamp 10.

While the operation of inductors 33 and 35 and capacitors 34 and 36 as a filter and matching network has not yet been described, it is significant to note that one could, using the teachings of the present invention, select components to combine with capacitors 31 and 32 to form resonant networks to solve the $CV^2f$ problem, which components would neither be filtering nor impedance matching components. However, according to the teachings of the present invention, by selecting a pair of tuned networks, as shown, for filtering and matching, such components, in addition to providing filtering and matching, inherently solve the $CV^2f$ problem.

Philosophically, if a Class D amplifier to drive an electrodeless lamp is built without regard for the radio frequency interference (RFI) problem, to be described more fully hereinafter, it would be generally found that the light level output would be higher than desired, perhaps 2500 lumens. But a customer typically wants to buy a 750 lumen bulb, or a 1000 lumen bulb, or a 1250 lumen bulb, so it is necessary to control the light level output. Thus, between the output of amplifier 14 and drive coil 18, an impedance matching network is necessary to set the level of the light output by matching the output impedance of amplifier 14 to the reflected resistance of the discharge.

In other words, if it is desired to deliver a certain amount of power to the load, an impedance at junction 28 of so many ohms must be set. If power equals $V^2/R$ and the voltage at junction 28 is constant, the amount of power will be inversely proportional to the resistance. As mentioned previously, with the values selected for capacitor 17 and coil 18, a resistance of 50 ohms is reflected back into the circuit at a given power level. According to the present invention, inductors 33 and 35 and capacitors 34 and 36 are used to convert this 50 ohms to a resistance value at the output of amplifier 14 which will give the desired power for the available voltage.

As a practical matter, capacitor 34 and inductor 35 are the elements generally varied to vary the output power level. Inductor 33 remains generally constant and capacitor 35 has been selected to have a value of 480 pf as a fixed reactive impedance at the frequency desired for filter 16.

Still further, if components 33-36 were used exclusively for impedance matching, there would be an RFI problem. That is, a Class D amplifier operates as an on/off switch and the output at junction 28 is a square wave at a frequency of 13.56 MHz. It is necessary to convert this square wave, which is rich in harmonics, to a sine wave to provide the high peak-to-peak voltage and clean waveform necessary to drive the load. Without a filter, the signal at inductor 18 not only contains the 13.56 MHz, but it also contains the harmonics thereof at fairly adequate signal levels. There is a harmonic at 54.24 MHz, a frequency close to that of television 2, and a harmonic at 67.8 MHz, a frequency close to that of television 4. Without a filter, the driving of an electrodeless discharge lamp at 13.56 MHz will create RFI which will interfere with channels 2 and 4 of the TV band.

Therefore, what is required is a filtering network which has a very low impedance at 13.56 MHz and a high impedance at all other frequencies. Components 33-36 can function as such a filter with the result that the same components, namely inductors 33 and 35 and capacitors 34 and 36, perform two functions, if properly selected. They match the impedance which allows one to set the light level output and they also function as an RFI filter. As mentioned previously, the same components perform a third function, namely the reduction of $CV^2f$ losses.

After filtering and impedance matching by components 33-36, capacitor 17 and inductor 18 form a high Q network which takes the voltage at the intersection of inductor 35 and capacitor 36 and multiplies it by the Q of the network to provide an electric field sufficient to initiate ionization of the medium within envelope 19. Coil 18 also produces a radio frequency magnetic field for maintaining such ionization.

Discussing further the RFI problem, it is especially acute at the frequencies of TV channels 2 and 4. According to another embodiment of the present invention, filter and matching network 16 may be further modified to reduce the RFI emissions at these two frequencies.

Figure 4:
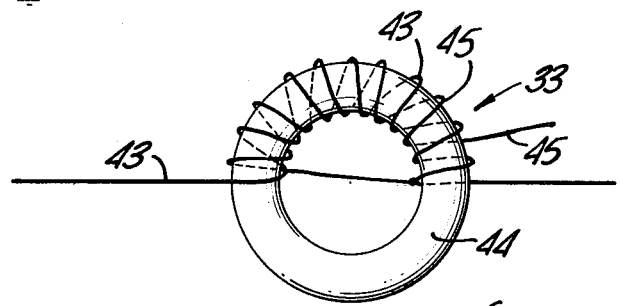
FIG. 4 is a plan view of one of the inductors of the filter and matching network of FIG. 3 showing an optional additional winding.
Figure 5:
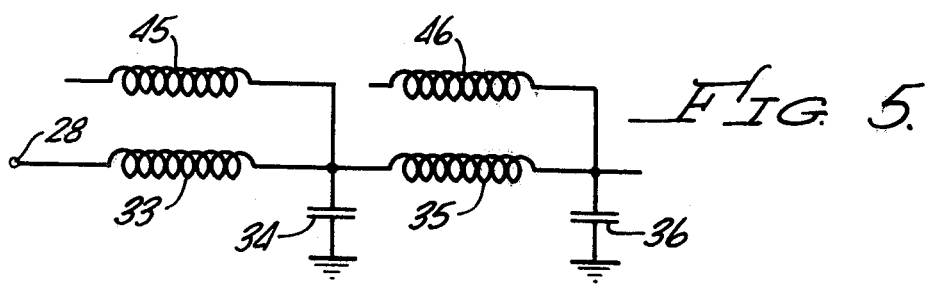
FIG. 5 is a circuit diagram of a second embodiment of filter and matching network incorporating the additional winding shown in FIG. 4.
Figure 6:
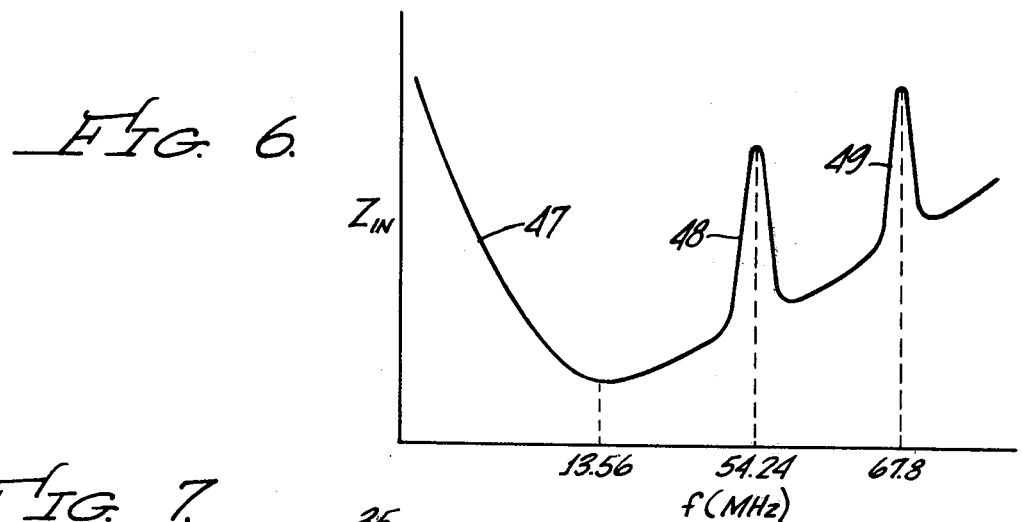
FIG. 6 is a graph of impedance versus frequency for the network of FIGS. 4 and 5.

Referring now to FIGS. 4-6, each of inductors 33 and 35, such as inductor 33, is constructed as shown in FIG. 4, including a coil of wire 43 wound around a toroidal core 44 of magnetic material. The construction of inductor 35 would be identical to that shown in FIG. 4. What is desired is to form a high impedance trap at 54.24 MHz and 67.8 MHz. Typically this is done using an inductor and a capacitor in parallel resonance at such frequency. According to the present invention, the same effect can be achieved by winding an additional coil on each of the cores of inductors 33 and 35, the additional winding being out of phase with the primary winding and wound in a reverse direction to the normal method of current flow. The actual physical appearance is shown in FIG. 4, where an additional winding 45 is wound around core 44. This additional winding is a free floating winding, terminated at one end only. Thus, the equivalent circuit is shown in FIG. 5 where floating windings 45 and 46 are shown with first ends connected to first ends only of inductors 33 and 35, respectively.

By winding coils 45 and 46 out of phase with windings 33 and 35, respectively, what is essentially created is a circuit which is parallel resonant at any frequency less than the self resonant frequency of the coil. The resultant impedance as a function of frequency of network 16 as shown in FIG. 5 is represented by the curve 47 in FIG. 6. Without coils 45 and 46, the impedance versus frequency curve has a minimum impedance at 13.56 MHz and an increasing impedance on either side of this frequency. With the addition of windings 45 and 46, notches, shown at 48 and 49, may be created at 54.24 MHz and 67.8 MHz, respectively.

Tests have shown that by winding coils 45 and 46 in between the windings of inductors 33 and 35, an optimum coupling for a minimum amount of wire may be achieved. Furthermore, adjusting the number of turns of windings 45 and 46 allows coils 33 and 35 to be made parallel resonant at any desired frequency. In practice, therefore, coils 45 and 46 are added with differing lengths until the desired frequency characteristics are achieved.

Figure 7:
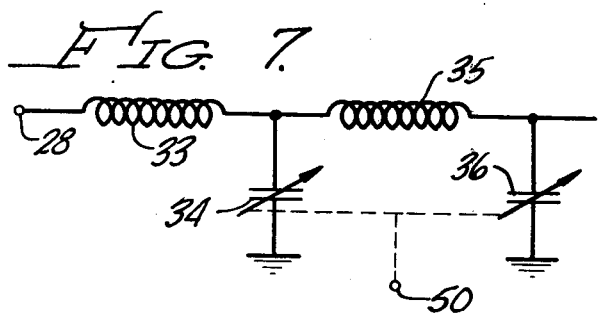
FIG. 7 is a circuit diagram of a third embodiment of filter and matching network for use in the lamp of FIG. 1.
Figure 8:
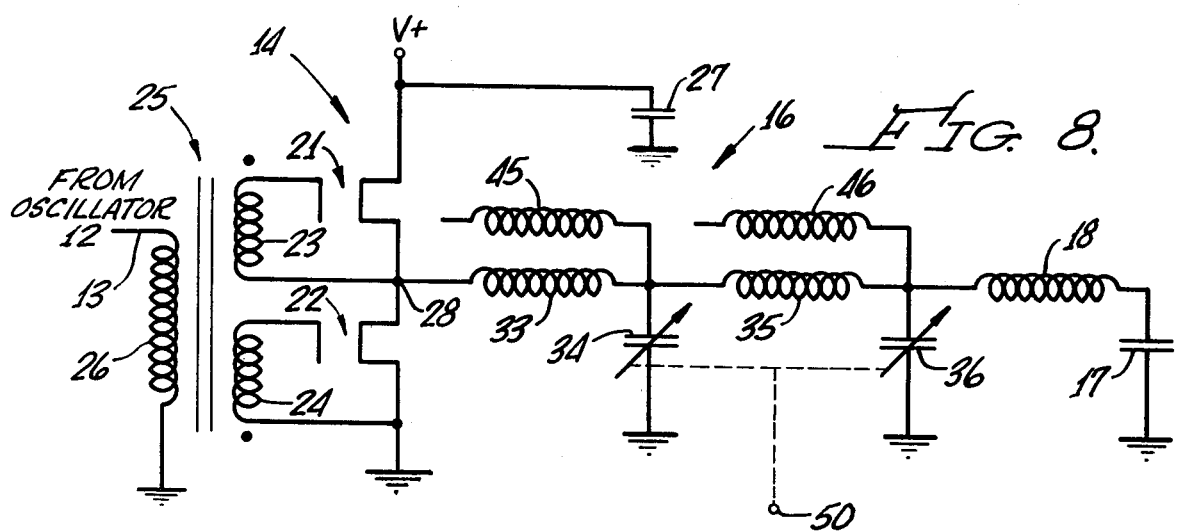
FIG. 8 is a circuit diagram of an RF amplifier and filter and matching network for use in the lamp of FIG. 1 incorporating all of the teachings of the present invention.

Referring now to FIG. 7, since filter and matching network 16 perform an impedance matching function which permits matching of the output impedance of RF amplifier 14 to the input impedance of the discharge, it is a further teaching of the present invention that the characteristics of impedance matching network 16 can be varied in order to adjust the light level. This teaching can be used to make a dimmable bulb.

Theoretically, any one or more of the components within matching network 16 can be adjusted to make a dimmable bulb. According to the present invention, the preferred technique is to make capacitors 34 and 36 variable and to gang them together and to connect them to an adjusting knob 50. In this manner, capacitors 34 and 36 can be simultaneously varied and, with the appropriate selection of components, the light output of lamp 10 can be adjusted over a wide range without effecting the overall efficiency of the system.

While the invention has been described with respect to the preferred embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In an electrodeless discharge lamp of the type including an ionizable medium within a sealed envelope capable of emitting radiant energy when subjected to a radio frequency field, an oscillator for generating an output signal at a given radio frequency, an RF amplifier responsive to said oscillator output signal, and an induction coil and a capacitor connected in series and responsive to the output of said amplifier, said coil being positioned in close physical proximity to said medium in said envelope for coupling to said medium an electric field having a magnitude sufficient to initiate ionization of said medium and a magnetic field for maintaining said ionization, the improvement wherein:

said amplifier is a Class D amplifier including first and second transistors connected in series and driven alternately on and off by said oscillator output signal, the junction between said transistors being coupled to said series connected induction coil and capacitor, there being no separate, discrete load circuit connected in the output circuit of said amplifier.

2. In an electrodeless discharge lamp according to claim 1, the improvement wherein said transistors are MOS devices, said oscillator output signal driving the gates of said MOS devices.

3. In an electrodeless discharge lamp of the type including an ionizable medium within a sealed envelope capable of emitting radiant energy when subjected to a radio frequency field, an oscillator for generating an output signal at a given radio frequency, an RF amplifier responsive to said oscillator output signal, and an induction coil responsive to the output of said amplifier, said coil being positioned in close physical proximity to said medium in said envelope for coupling to said medium an electric field having a magnitude sufficient to initiate ionization of said medium and a magnetic field for maintaining said ionization, the improvement wherein:

said amplifier is a Class D amplifier including first and second transistors connected in series and driven alternately on and off by said oscillator output signal, and further comprising:

a filter network positioned between the junction between said transistors and said induction coil for presenting a low impedance to said given radio frequency and a higher impedance to all other frequencies.

4. In an electrodeless discharge lamp according to claim 3, the improvement wherein said filter network is also an impedance matching network for matching the impedance of the output of said RF amplifier to the reflected resistance of the discharge in said envelope.

5. In an electrodeless discharge lamp according to claim 3 or 4, the improvement wherein said filter network comprises:

a tuned LC network connected between said junction of said transistors and said induction coil.

6. In an electrodeless discharge lamp according to claim 5, the improvement wherein said tuned LC network consists of an inductor and a capacitor connected in series and to the junction of said transistors, said induction coil being connected to the junction of said inductor and said capacitor of said tuned network.

7. In an electrodeless discharge lamp according to claim 6, the improvement wherein said inductor of said tuned network comprises a coil wound on a toroidal magnetic core and further comprising:

a second coil wound on said core in out-of-phase relationship with the first coil wound thereon and wound in a reverse direction, a first end only of said second coil being connected to one end of said first coil.

8. In an electrodeless discharge lamp according to claim 7, the improvement wherein the turns and length of said second coil are adjusted to form a parallel resonant circuit at any frequency less than the self resonant frequency of said first coil.

9. In an electrodeless discharge lamp according to claim 6, the improvement wherein said capacitor of said tuned network is variable to adjust the light level output of said lamp.

10. In an electrodeless discharge lamp according to claim 3 or 4, the improvement wherein said filter network includes first and second tuned LC networks connected between said junction of said transistors and said induction coil.

11. In an electrodeless discharge lamp according to claim 10, the improvement wherein each of said tuned LC networks consists of an inductor and a capacitor connected in series, said first tuned network being connected to the junction of said transistors, said second tuned network being connected to the junction of the inductor and capacitor of said first tuned network, said induction coil being connected to the junction of the inductor and capacitor of said second tuned network.

12. In an electrodeless discharge lamp according to claim 11, the improvement wherein each of said inductors of said first and second tuned LC networks comprises a first coil wound on a toroidal magnetic core and further comprising:

a second coil wound on each of said cores in out-of-phase relationship with the first coil wound thereon and wound in a reverse direction, first ends only of said second coils being connected to one ends of said first coils.

13. In an electrodeless discharge lamp according to claim 12, the improvement wherein the turns and lengths of said second coils are adjusted to form parallel resonant circuits at any frequencies less than the self resonant frequencies of said first coils.

14. In an electrodeless discharge lamp according to claim 11, the improvement wherein at least one of said inductors or capacitors of said tuned networks is variable to adjust the light level output of said lamp.

15. In an electrodeless discharge lamp according to claim 14, the improvement wherein one of said capacitors is adjustable.

16. In an electrodeless discharge lamp according to claim 15, the improvement wherein both of said capacitors are variable and are interconnected for simultaneous variation.

17. In an electrodeless discharge lamp of the type including an ionizable medium within a sealed envelope capable of emitting radiant energy when subjected to a radio frequency field, an oscillator for generating an output signal at a given radio frequency, an RF amplifier responsive to said oscillator output signal, and an induction coil responsive to the output of said amplifier, said coil being positioned in close physical proximity to said medium in said envelope for coupling to said medium an electric field having a magnitude sufficient to initiate ionization of said medium and a magnetic field for maintaining said ionization, the improvement wherein said amplifier is a Class D amplifier including first and second transistors connected in series and driven alternately on and off by said oscillator output signal, and further comprising:

a combination filter and matching network operatively coupled between the junction between said transistors and said induction coil for presenting a low impedance to said given radio frequency and a higher impedance to all other frequencies and for matching the impedance of the output of said RF amplifier to the reflected resistance of said discharge in said envelope.

18. In an electrodeless discharge lamp according to claim 17, the improvement wherein said combination filter and matching network further combines with the output capacitance of said transistors to reduce $\frac{1}{2}CV^2f$ losses.

19. In an electrodeless discharge lamp according to claim 17, the improvement wherein at least one of the elements of said filter and matching network is variable to adjust the light level output of said lamp.

20. A filter network comprising:
a tuned circuit including an inductor and a capacitor tuned to a given frequency so as to present a low impedance to said given frequency and a higher impedance to all other frequencies, said inductor comprising a first coil wound on a toroidal magnetic core; and
a second coil wound on said core in out-of-phase relationship with said first coil, a first end only of said second coil being connected to one end of said first coil, the length of said second coil being adjusted to form a parallel resonant circuit at any frequency less than the self resonant frequency of said first coil.

21. A filter network according to claim 20, wherein said any frequency is a harmonic of said given frequency.

* * * * *